United States Patent
Moulton (10) Patent No.: US 11,077,328 B2
(45) Date of Patent: Aug. 3, 2021

(54) APPARATUS FOR IMPROVING VERTICAL FLOW REACTOR UTILITY

(71) Applicant: David Stanley Moulton, Hondo, TX (US)

(72) Inventor: David Stanley Moulton, Hondo, TX (US)

(*) Notice: Subject to any disclaimer, the term of this patent is extended or adjusted under 35 U.S.C. 154(b) by 0 days.

(21) Appl. No.: 16/801,184

(22) Filed: Feb. 26, 2020

(65) Prior Publication Data

US 2021/0106861 A1  Apr. 15, 2021

Related U.S. Application Data

(60) Provisional application No. 62/914,990, filed on Oct. 14, 2019.

(51) Int. Cl.
  *C02F 11/08* (2006.01)
  *A62D 3/38* (2007.01)

(52) U.S. Cl.
  CPC ..................... *A62D 3/38* (2013.01)

(58) Field of Classification Search
  CPC ......... C02F 11/08; C02F 11/083; C02F 11/00; A62D 3/38; A62D 2203/10
  USPC ....................................................... 588/320
  See application file for complete search history.

(56) References Cited

U.S. PATENT DOCUMENTS

| | | | |
|---|---|---|---|
| 4,744,908 A | 5/1988 | Peterscheck et al. | |
| 4,792,408 A | 12/1988 | Titmas | |
| 4,803,054 A | 2/1989 | Sillerud et al. | |
| 6,444,130 B1 * | 9/2002 | Manganaro | C02F 11/08 |
| | | | 210/750 |

OTHER PUBLICATIONS

Anon, Aqueous-Phase oxidation of Sludge Using the Vertical Reaction Vessel System Report No. EPA/600/S2-87/022 Cincinnati, Ohio, 45268. May 1987. (1 page).

Areeprasert et al. A Review of Pilot-Scale Applications of Hydrothermal Treatment for Upgrading Waste Materials, International Journal of Environmental Science and Development, 7(6), Jun. 2016. (6 pages).

Kudra et al. Modeling of Supercritical Oxidation of Aqueous wastes in a Deep-Well Reactor, AIChE Journal, 38(7), Jul. 1992, p. 988 ff. (15 pages).

Lovo et al, Modeling and Simulation of Aqueous Hazardous Waste Oxidation in Deep-Well Reactors, Chem. Eng. Sci, 45(8), 2703 (1990) (8 pages).

Mittal et al. Numerical Simulation of Deep-Well Wet Oxidation Reactor Using Steam, pp. 796-819. (22 pages).

* cited by examiner

*Primary Examiner* — Edward M Johnson
(74) *Attorney, Agent, or Firm* — Shah IP Law, PLLC (57) ABSTRACT

The present invention is for an improved vertical flow reactor utility that makes the technology more attractive for industrial development. The various embodiments of the invention improve various aspects of a vertical flow reactor utility. For example, in accordance with an embodiment of the invention, the design of the reactor is improved. Other embodiments provide improved systems and methods for, for example, insertion of oxygen, electrical production, and/or reactor geometry. These one or more various embodiments of the present invention lowers costs to construct, install, and/or operate a vertical flow reactor by improving economy of construction and/or operation of VFR systems.

28 Claims, 2 Drawing Sheets

APPARATUS FOR IMPROVING VERTICAL FLOW REACTOR UTILITY

This application claims priority to U.S. Provisional Patent Application Ser. No. 62/914,990, filed 14 Oct. 2019 entitled "Apparatus and Design for Improving Vertical Flow Reactor (VFR) Utility." The entire content of that application is incorporated herein by this reference.

BACKGROUND

Field of the Art

The present invention relates to apparatus and method for improving vertical flow reactor utility.

Discussion of the State of the Art

It is known to use a long chemical reactor, oriented vertically and extended down below ground level for several thousand feet (for example, 5400 and 6400 feet) for vertical flow reactor utility. James C. Burleson, "Method and Apparatus for Disposal of a Broad Spectrum of Waste Featuring Oxidation of Waste," U.S. Pat. No. 4,564,458 (4 Jan. 1986). This design of a reactor provided for oxidation to reduce toxicity of waste materials and the volume of reaction products required for safe disposal of the waste materials on the surface. This general type of reactor can be referred to as a "Vertical Flow Reactor" (VFR).

The VFR contains two flow paths going in opposite directions: an inlet flow path and an outlet flow path. A pipe in or near the center of the VFR functions as a flow partition separating the inlet flow path from the outlet flow path. In principle, the inlet flow can be in either the space between the flow partition and the outer reactor wall, or the inlet flow can be in the center, within the flow partition. The outlet flow, in either case, goes out the other path; however, directing the inlet flow path to the center is preferred for engineering design reasons explained below. Without limiting the scope or spirit of the present invention, the descriptions used herein use the inlet flow in the center.

In operation, a slurry of waste in water is pumped into the VFR and oxygen is bubbled into the slurry. Waste, water, and oxygen are the main constituents of the inlet stream. The inlet stream also is called the feed stream, because the inlet stream contains the material consumed in the chemical reaction. In a high temperature section, normally in the lower part of the reactor, oxygen reacts with the waste and produces reaction products and heat.

Everything that enters the VFR in the feed stream goes out of the reactor in the effluent stream at the surface: none of the stream is left underground. But the waste put into the VFR gets converted by oxidation to forms that can be more safely and easily introduced into the environment at the surface. Reaction products in the effluent include carbon dioxide, additional water, ash, and some light organic acids (principally acetic acid).

The United States Environmental Protection Agency (EPA) and the city of Longmont, Colo. reported a pilot-scale application of the VFR concept with some variations from the Burleson system described above. United States EPA, "Project Summary: Aqueous-Phase Oxidation of Sludge Using the Vertical Reaction Vessel System," Report EPA/600/52-87/022 (May 1987). Burleson emphasized the use of cemented casing of the hole as the outer wall of the reactor and described operation at temperatures above the water critical temperature; that is, Burleson described the chemical reaction as super-critical water oxidation (SCWO). The EPA sponsored Longmont pilot plant used a reactor placed within the cased and cemented hole, leaving a small monitoring space between the outer wall of the reactor and the casing of the hole. This facilitated instrumentation for process control and leak detection before any leaked material could have entered the underground surroundings. No leaks were reported.

The EPA-Longmont pilot plant also used lower temperatures than the water critical temperature, so the pilot plant operated entirely within the liquid phase (described as wet oxidation). By definition, above the critical temperature for water, steam cannot be compressed to form a liquid phase. In the EPA-Longmont pilot study, the reactor bottom hole temperature varied from about 501° K (442° F., 228° C.) to 555° K (540° F., 282° C.), well below the temperature Burleson envisioned.

The EPA-Longmont pilot plant used waste water treatment plant (WWTP) sludge as the waste for destruction. Chemically, WWTP sludge is mostly cellulose. The EPA reported the pilot plant operation as successful in making major reductions in both the chemical oxygen demand (COD), and the total suspended solids in the effluent stream. In addition, chemical analyses of both the liquid and solid products showed low toxicity, and were typically well below the EPA limits for safe disposal. A centrifuge easily dewatered the solid product and the process dramatically reduced the volume requiring landfill disposal, as compared with the volume of the original sludge Despite the success of the EPA-Longmont experience, industrial development has proceeded only slowly. The Journal of Environmental Sciences reported a review of SCWO technologies and referred to " . . . the unwillingness of industries to invest in novel, and potentially superior, waste treatment technologies." Veriansyah, Bambang, and Kim Jae-Duck, "Supercritical Water Oxidation for the Destruction of Toxic Organic Wastewaters: A Review," 19 Journal of Environmental Sciences 517 (2007). The same is true for wet oxidation in general, and for the VFR technology in particular.

Therefore, it would be desirable to make VFR more attractive for industrial development by improving the utility of VFR, that is, by lowering costs or otherwise improving the economy of construction and operation of VFR systems.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope or spirit of the claimed subject matter.

Apparatus and methods in accordance with the principles of the present invention improving vertical flow reactor utility to make this technology more attractive for industrial development by lowering costs and otherwise improving the economy of construction and operation of VFR systems.

More specifically, in accordance with the principles of the present invention a vertical flow reactor is provided. The vertical flow reactor comprises a casing, an outer wall, and a flow partition. The outer wall of the vertical flow reactor is partially above and partially below ground level of a bore hole in which the vertical flow reactor is contained. The outer wall and the flow partition together contain the chemical reaction, and the casing supports the vertical flow reactor. The outer wall of the vertical flow reactor is contained within the casing. An annular space is defined between the outer wall and the casing. The flow partition is contained within the outer wall. In an embodiment of the present invention, the flow partition positioned in the center of the vertical flow reactor.

A transport apparatus directs pre-mixed waste and water feed components into the flow partition at or near the upper portion of the vertical flow reactor. The waste and water feed components flow downward in the flow partition and exit in the annular space outside of the flow partition, where the waste and water feed components flow upward.

A compressor introduces oxygen into the waste and water feed components. The waste, water, and oxygen combination flows downward within the flow partition such that, the waste, water, and oxygen combination is heated by heat transfer from liquid flowing upward in the annular space outside the flow partition.

In an embodiment of the present invention, the vertical flow reactor define an annular to center area ratio, the annular to center area ratio being about 1.8 to facilitate high destruction efficiency while maintaining a high level of pressure protection against boiling. In a further embodiment of the present invention, the vertical flow reactor defines a length to diameter ratio, the length to diameter ratio of the vertical flow reactor being about 3300 to provide higher volume throughput and higher exit stream temperature.

In an embodiment of the present invention, the annular space defined between the outer wall and the casing contains a pressurizing liquid to add pressure between the outer wall and the casing, The pressurizing liquid is sufficient to at least partially balance pressure inside the outer wall, whereby enabling reactor wall thickness to be reduced.

In an embodiment of the present invention, the compressor introduces oxygen into the waste and water feed components at or near the upper portion of the vertical flow reactor. The oxygen is introduced in bubbles sufficiently small that the rise rate of oxygen bubbles is slower than the flow speed of the waste and water feed components.

In an embodiment of the present invention, a lower portion of the flow partition is insulated to reduce heat transfer. The insulation inhibits heat transfer such that temperature is higher over a portion of the flow path relative to the temperature in an absence of the insulation. The higher temperature maintains a reaction rate higher relative to the reaction rate in an absence of the insulation, thereby causing more complete destruction of waste and raising the exit temperature.

BRIEF DESCRIPTION OF THE DRAWING FIGURES

The accompanying drawings illustrate several embodiments and, together with the description, serve to explain the principles of the present invention according to the embodiments. It will be appreciated by one skilled in the art that the particular arrangements illustrated in the drawings are merely exemplary and are not to be considered as limiting of the scope or spirit of the present invention or the claims herein in any way.

As noted above, in the above reference figures, the present invention is illustrated by way of example, not limitation, and modifications may be made to the elements illustrated therein, as would be apparent to a person of ordinary skill in the art, without departing from the scope or spirit of the invention.

DETAILED DESCRIPTION

The present invention relates to apparatus and method for improving Vertical Flow Reactor (VFR) utility.

Initial Considerations

Generally, one or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, and other changes may be made without departing from the scope or spirit of the present invention. Particular features of one or more of the embodiments described herein may be described with reference to one or more particular embodiments or figures that form a part of the present invention, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the present invention in any way.

Devices and parts that are connected to or in communication with each other need not be in continuous connection or communication with each other, unless expressly specified otherwise. In addition, devices, and parts that are connected to or in communication with each other may connected or communicate directly or indirectly through one or more connection or communication means or intermediaries, logical or physical.

A description of an aspect with several components in connection or communication with each other does not imply that all such components are required. To the contrary, a variety of optional components may be described to illustrate a wide variety of possible embodiments and in order to more fully illustrate one or more embodiments. Similarly, although process steps, method steps, or the like may be described in a sequential order, such processes and methods may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process or method is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity; however, it should be appreciated that particular embodiments may include multiple iterations of a technique or multiple instantiations of a mechanism unless noted otherwise. Alternate implementations are included within the scope or spirit of various embodiments in which, for example, functions may be executed out of order from that shown or discussed, including substantially concurrently or in reverse order, depending on the functionality involved, as would be understood by those having ordinary skill in the art.

Conceptual Design and Detailed Description

In general, computations can be made for chemical reactors, typically based on determining a balance between the heat entering, generated within, and leaving small subsections of the reactor and, simultaneously, a balance of the mass (classified by chemical composition) entering, generated within by reaction, reacted away, and leaving (by flow) small subsections of the reactor. Such computations are referred to herein as heat and mass balance computations. Heat and mass balance computations were developed and used to determine reactor profiles of temperature, pressure, flow speed, chemical composition, density, heat transfer data, and other process variables as the material flows through the reactor in steady state operation. As used herein, "steady state operation" means that the equipment is not in the process of starting, stopping, changing feed composition or otherwise making any significant changes in operating conditions.

Results obtained from several heat and mass balance computations indicate that the current utility of the VFR technology can be improved in several areas that will be addressed herein: design of the reactor, insertion of oxygen, electrical production, and reactor geometry.

With respect to design of the reactor, while facilitating process control and environmental protection the use of a separate reactor within the well casing (instead of letting the well casing be the outer wall of the reactor) adds greatly to the cost of a VFR system. This is because the pressure and temperature conditions at the bottom of the reactor require a thick steel wall. In accordance with one aspect of the principles of the present invention, an improved design of the reactor is provided.

With respect to insertion of oxygen, most descriptions of VFR or similar reactors include an oxygen insertion tube extending several hundred feet into the reactor, and in some concepts, clear to the bottom of the reactor. The heat and mass balance computations show that a lengthy oxygen insertion tube adds to the cost and causes a decrease in reactor efficiency. In accordance with one aspect of the principles of the present invention, an alternative approach of oxygen insertion into a VFR is provided.

With respect to electrical production, the heat produced by the chemical reaction is sufficient to generate a significant amount of electricity when the temperature in the outlet stream is sufficiently high. The exit temperature, as well as the reactor maximum temperature, are functions of the heat of combustion of the waste material, the concentration of waste material in the feed, the flow rate of the feed stream, the reactor geometry, and the materials of reactor construction. Electricity production from a hot water source, such as would be provided by an operating a VFR (or hot water from any source) is well known to increase in efficiency as the water temperature increases. In accordance with one aspect of the principles of the present invention, the VFR is designed in such a way that the product exit temperature is high to aid in the efficient production of electricity. Electricity production from the heat generated by the VFR can be used within the overall plant or sold.

With respect to reactor geometry, improved reactor geometry can facilitate efficient and safe VFR operation, including high waste destruction efficiency, avoidance of vaporization within the reactor, and easier process control. In accordance with one aspect of the principles of the present invention, the reactor wall thickness requirement, the introduction of oxygen into the feed stream, the effluent exit temperature, and engineering design features are addressed.

With respect to reactor wall thickness, required reactor wall thickness for safe operation of a VFR made from steel pipe, operating with a maximum temperature of 617 K (650° F., 343° C.) and a total depth of about 1905 meters (6250 feet), would be quite thick and heavy in order to contain the high pressure within the reactor. Thick and heavy reactor wall thickness would be more expensive to purchase, and more expensive to handle, than a lighter weight pipe of similar length. In accordance with one aspect of the principles of the present invention, the required wall thickness can be reduced by adding pressure on the outside of the VFR sufficient to balance or partially balance the pressure inside the reactor. The wall thickness requirement is driven by the difference in pressure from the inside to the outside, not the total pressure. Added pressure could be applied within the monitoring space between the outside of the reactor wall and the well casing. This would provide a balance, or a partial balance, to pressure inside the reactor.

In accordance with one aspect of the principles of the present invention, pressurizing that space with an unreactive gas such as nitrogen or argon is contemplated; however, since maintaining the pressure would require equipment such as compressors, pressure regulators, valves, fittings or other items that could be subject to failure, use of such gas is not preferred. The use of a liquid could be safer and better, as the weight of the liquid would provide an aspect of the partially compensating pressure, and top-side equipment would not be required to keep the liquid in place. Furthermore, liquid pressure outside the VFR would increase with depth, approximately like the pressure increase due to depth within the reactor. This external pressure would keep the pressure difference across the wall of the reactor within a range that could be safely handled by a thinner reactor wall.

Thus, in accordance with one aspect of the principles of the present invention use of such a liquid, herein referred to as a "pressurizing liquid", could reduce the cost of materials used for VFR construction and the cost of its associated handling and assembly. There may be many examples of liquid materials that meet the physical requirements and would work well for this application. By non-limiting example, "Dowtherm A" heat transfer fluid available from the Dow Chemical Company, Global Dow Center, 2211 H. H. Dow Way, Midland, Mich. 48674 has the required properties.

With respect to insertion of oxygen, oxygen compression is expensive, not only because of the direct cost of operating a compressor, but also because some dangers are associated with oxygen handling that compound with increases in the compressed oxygen final pressure. Oxygen compression also increases costs because more expensive metals, and more complicated handling procedures, are required for safety. It is therefore desirable to introduce oxygen at as low a pressure as possible into the feed stream.

The lowest possible pressure is at the top of the VFR. Requirements for introduction include that the volume of oxygen be less than the volume of the rest of the feed stream, and that the bubbles be sufficiently small that their rise rate is slower than the flow speed of the feed stream. Small bubbles can be achieved by any of several methods, including the following examples of utilizing the venturi effect and a sparger.

One non-limiting example method is to introduce the oxygen into the flowing stream through a venturi, in which a reduction in fluid pressure results when fluid flows through a constricted section (or choke) of a pipe. Use of a venturi causes the flow stream to quickly experience severe turbulence that results in dividing the bubbles down into small size bubbles. These bubbles rise slowly in still water, and would be carried downward in a down flowing stream.

Another non-limiting example method is to introduce the oxygen into the flowing stream through a sparger, which consists of a porous material through which the gas goes into the liquid in bubbles that have a size dependent on the sparger pore size and the flow speed of the liquid. While a venturi would generally give the smallest size bubbles, for some conditions of flow rate and pressure a sparger may be sufficient and less expensive to purchase and operate than a venturi.

Both examples, among other potential candidates, would work for introducing oxygen into the inlet stream at the top of the VFR in sufficiently small bubbles to get carried down and through the reactor provided the feed stream has sufficient speed. The venturi would typically allow a lower minimum flow speed than a sparger; however, any method for the introduction of oxygen that will produce sufficiently small bubbles is acceptable. Thus, in accordance with one aspect of the principles of the present invention a method of oxygen introduction at or near the top of the VFR is provided using existing and inexpensive procedures and equipment.

The weight of the liquid within a VFR can provide most of the pressure needed to keep the material in the liquid phase. This requires the VFR to extend from ground level to about 5000 feet (1524 meters) or more below ground level, depending on the temperatures within the reactor. Higher temperatures provide faster chemical reaction rates, but also require higher pressure to prevent boiling and keep the material liquid. It is well known that large diameter pressure vessels require thicker walls to contain a given pressure than small diameter vessels of the same kind of metal. This gives an economic advantage to using relatively small diameter pipes for the VFR.

It has been discovered that an increase in the reactor effluent temperature can be achieved by reducing the heat-transfer property of the lower portion of the flow partition separating the inlet and effluent flows. This can be achieved by any method of reducing the heat transfer property of the lower portion of the flow partition. As non-limiting example, applying thin insulating ceramic coatings is well known to reduce heat transfer over that of bare metal. A thicker lining is even more effective, and inserting an insulating cylinder that fits within the metal pipe that forms the flow partition also would reduce heat transfer. The insulating cylinder could be made from a ceramic or ceramic-like material that could withstand the reaction conditions. The insulating material also could be placed outside the lower partition, or used both inside and outside. Using an insulating ceramic pipe instead of the metal pipe also would work, assuming an insulating ceramic pipe could be manufactured in the appropriate sizes and field assembled.

The heat and mass balance computations referred to previously also have been used to determine temperature profiles for a VFR with and without insulation in the lower section. Use of the insulation increased the reactor exit temperature by 25° K (45° F., 7° C.), increased the conversion to benign products, and increased the daily waste feed rate while still maintaining maximum reactor temperature. In addition, the VFR also could be operated at a lower waste feed rate with than without the insulation. This has the advantage that if only a small amount of waste should be available at some time, the VFR can be operated at a lower feed rate without requiring a shut down.

An effect similar to that of insulating the lower portion of a reactor on the effluent temperature also can be realized in a large diameter VFR, suitable for high volume waste disposal. This occurs because increases in the reactor diameter increases flow rate in proportion to the square of the reactor diameter, but increases the heat transfer area only in proportion to the reactor diameter. For example, comparing a 10 inch (25.4 cm) VFR with a 20 inch (50.8 cm) VFR at the same inlet flow speed and composition, the larger diameter VFR could process about four times as much waste as the smaller diameter VFR, and would have only twice the area available for heat transfer between the inlet and outlet streams. This makes the VFR particularly attractive where large volumes of waste are available for disposal. It also means that the optimum ratio of length to diameter is between 2600 and 4000, and preferably about 3300.

With respect to design parameters for improving VFR utility in accordance with the principles of the present invention, maximum reactor temperature is the highest temperature in the reactor at any given time, and the most important temperature pertaining to the overall reactor performance. In normal operation the maximum reactor temperature occurs in the upward flowing stream and should be measured continuously for process control. Most descriptions and diagrams of VFR-type reactors indicate sensors between the outer reactor wall and the casing, but most descriptions and diagrams of VFR-type reactors also show the upward flow in the center section.

Because of flow variations, turbulence or temperature gradients associated with heat transfer, temperature sensors within the center portion of the reactor could interfere with the flow and also produce rapidly varying results. To avoid such problems, the flow should preferably go upward in the outer annular space rather than in the center. Temperature sensors between the outer reactor wall and the casing would not be in direct contact with the process flow and would therefore produce high quality signals.

The maximum reactor temperature affects important aspects of performance. An aspect of performance that is well-known concerns the variation in solubility of a variety of minerals common in water that has not been purified, as will be discussed in more detail below. Another aspect concerns the potential for boiling within the reactor. The vapor pressure of water is a function of temperature and pressure required to keep water from boiling at the given temperature. Pressure in excess of the water vapor pressure will keep water from boiling. Boiling within flowing systems is generally unstable, that is, boiling occurs vigorously for a brief time, simultaneously cooling and expanding the flow volume. Then, the boiling stops until the temperature rebounds sufficiently for another episode. The overall effect is like that of a periodic geyser, and is common even in small chemical lab equipment. In a VFR boiling would be unsafe and could cause significant damage. The pressure profile within the VFR can be determined, as can the water vapor pressure and the difference between the pressure profile and the water vapor pressure. This differential pressure is the pressure protection against boiling.

The diameter, and thus the cross-sectional area of the pipe comprising the flow partition affect the VFR operation and economy. Smaller diameter pipes are less expensive, and consume less reactor volume than larger diameter pipes. If too small, the diameter provides insufficient area for adequate heat transfer. If the diameter is too large, the reactor tends to operate at higher temperatures overall, and provides less pressure protection against boiling.

It has been found that VFRs can operate with annular to center area ratios between about 1.3 and 2.4. Near the 2.4 ratio, the reactor turn-down ratio is only about 1.5, so the turn-down ratio could be very difficult to sustain operation during a period of low feed availability. At lower ratios, about 1 to 1.5, a relatively small excess temperature above 627° K (650° F., 343° C.) drops the pressure protection against boiling down below 50 psi; however, at the ratio of 1.8, the reactor can operate at a slightly lower temperature with excellent conversion and a turndown ratio of 9 to 1 (2587 wet tons per day to 285 wet tons per day). The reactor outlet temperature for normal operation is 468° K (383° F., 195° C.) and for maximum turndown, the exit temperature is 419 K (291° F., 144° C.). For these reasons, annular to center area ratios between 1.6 and 2.0 are preferred.

In the range of annular to center area ratios from 1.3 to 2.4 for a 20 inch (50.8 cm) reactor, three standard pipe sizes are available. These are designated as 10 inch (25.4 cm), 11 inch (27.9 cm), and 12 inch (30.5 cm). The standard pipe sizes are all available with schedule 40 dimensions. The annular to center ratio for the 11 inch (27.9 cm) pipe in a 20 inch (50.8 cm) reactor is 1.78 and is preferred for that application.

Taken together, these improvements improve safety, reduce the cost of constructing and operating a VFR, and improve the rate of conversion to a readily disposable form. These improvements also increase the amount of electricity that can be generated using the heat from the waste processed.

Design Architecture

Figure 1:
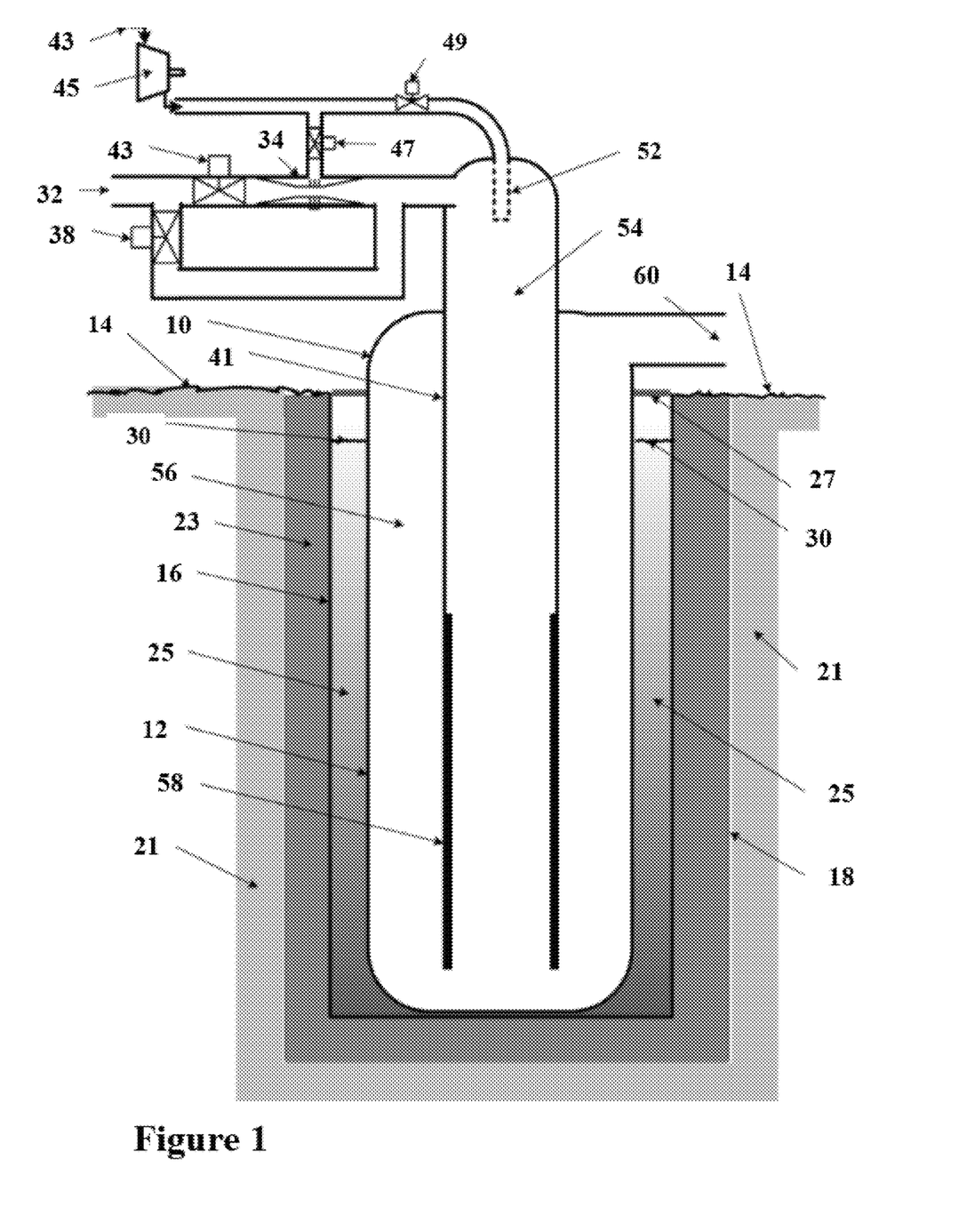
FIG. 1 is a schematic diagram of a non-limiting example Vertical Flow Reactor (VFR) in accordance with the principles of the present invention

In more detail and referring now to FIG. 1, a schematic diagram of a non limiting example sectional view through a Vertical Flow Reactor (VFR) in accordance with the principles of the present invention extending down into a cased and cemented bore hole is depicted. The VFR comprises an outer wall; the numeral 10 indicates the outer wall of the VFR above ground level 14 while the numeral 12 indicates the outer wall of the VFR below ground level (14). The numeral 16 identifies casing that has been placed within the well bore 18 in a surrounding formation 21.

The space between the casing (16) and the bore hole (18) has been filled with cement 23, which holds the casing (16) tightly in place. The cement (23) penetrates a short distance into the surrounding formation (21) and attaches to the surrounding formation (21) securely to prevent migration of material along the outer surface of the casing (16) from level to level, thus preventing intermixing of the various strata.

The diameter of the well bore (18) depends on the drill bit used, and casing (16) diameters can be obtained that fit inside the well bore (18) diameter made by many standard bit sizes with room for the cement. The depth of the well bore (18) is preferably about 1890 meters (6200 feet), which gives about a 15 mPa (2200 psi) pressure boost due to the weight of the feed and products in the reactor with a typical reactor temperature profile. This pressure is in addition to the pressure coming from feed pressurization that may be done at the surface by well-known means for process control, and is not shown in FIG. 1. A typical total pressure at the bottom of a VFR of this depth would be about 22 mPa (3200 psi), but individual applications may differ with different design details.

Annular space 25 between the outer wall of the VFR and the casing (16) contains such instruments as temperature sensors for use in process control. These are of well-known design and are not shown. They may penetrate a cover seal 27 and extend downward to the desired depth as needed. The rest of the annular space 25 between the outer reactor wall (10, 12) and the casing (16) is filled with a pressurizing liquid. The top of the pressurizing liquid is indicated by the numeral 30.

The pressure difference between the inside and the outside is about 5.9 mPa (860 psi). To prevent reactor wall failure by any means, such as rupture, cracks, holes caused by corrosion, etc., industrial standards (having the force of law) require a minimum wall thickness for a given pressure difference across the wall, the reactor composition and geometry, the temperature and other operating conditions, along with a few other factors. By reducing the pressure difference across the wall from the total pressure within the reactor of about 22 mPa (3200 psi) to about 5.9 mPa (860 psi), the minimum required reactor wall thickness can be reduced accordingly.

For example, the estimated required reactor wall thickness for a steel VFR operating with a maximum temperature of 617° K (650° F., 343° C.) and a total depth of about 1890 meters (6200 feet) and using no pressurizing liquid, could be about 2.86 cm (1.125 inches), and a 6.1 meter (20 foot) segment of such pipe could weigh about 1268 kg (2794 lbs.). If the maximum pressure difference from the inside of a steel reactor wall to the outside were reduced as described above by using a pressurizing liquid, the estimated required thickness could be less than 1.03 cm (0.406 inches). A 6.1 meter (20 foot) segment of pipe would only weigh about 486 kg (1071 lbs.). The above minimum wall thickness estimates represent the trend and provide general guidance for planning, but these estimates have not been rigorously determined according to all the applicable industry standards and should not be regarded as definitive.

The apparatus for conducting the feed components into the VFR is depicted in the upper left corner of FIG. 1, which shows two alternate feed routes for operating at different ranges of capacity. It is well known that large bubbles rise faster than small bubbles when compared in the same liquid and same conditions. Example alternate means of introducing the oxygen into the waste and water mixture are shown that provide small bubbles in different size ranges. These may be used to accommodate different ranges of liquid feed rates into the VFR.

The pre-mixed waste and water enter at numeral 32. The water in this mixture may be any available potable or nonpotable water. Also, the water may be liquid recycled from the effluent stream, or the water may be a waste stream consisting mostly of water but also containing a low concentration of waste. The premixing is done to provide a stream of a controlled concentration of waste. This controlled waste concentration maybe made by mixing high and low concentration streams by well-known and customary means, and is not shown here.

After the pre-mixed waste and water enter, the flowing waste and water mixture may be directed to a venturi 34, which consists of a constriction in a flowing stream and designed to draw in a second fluid. In this embodiment the flowing waste and water mixture draws in the oxygen. A first valve 36 and a second valve 38 can direct the waste and water mixture by two alternate routes into the top of the VFR. When first valve (36) is open and second valve (38) closed, the flowing waste and water mixture is directed to the venturi (34); when second valve (38) is opened and first valve (36) is closed, the flow by-passes the venturi (34) and enters the top of a flow partition 41 at the top of the VFR.

Oxygen enters the system at numeral 43, going into a compressor 45, where the pressure is raised sufficiently high to cause the oxygen to flow into the waste and water mixture by alternative routes. A third valve 47 and a fourth valve 49 are provided. When third valve (47) is open and fourth valve (49) is closed, the oxygen flow goes to the venturi (34) for mixing into the waste and water stream. The alternate route with fourth valve (49) open and third valve (47) closed directs the oxygen flow to a sparger 52 located within the top portion of the flow partition (41).

The sparger (52) consists of a tube constructed of a porous material, such as sintered stainless steel, that the oxygen flows through to enter the waste and water mixture. Other materials than sintered stainless steel are available and may be used based on their physical properties and specifications. The sparger (52) is of a length and diameter to provide sufficient surface area to accommodate the oxygen flow without requiring an unusually high pressure drop.

To provide the required surface area, the sparger (52) may extend several tens of meters downward into the top section of the VFR and within the flow partition. For example, in this non-limiting example embodiment the sparger (52) might be 50 meters (164 feet) in length, but it is understood that this is still at or near the top of the VFR, relative to the VFR total length. The size parameters relating to sparger performance may be determined by reference to data published by sparger manufacturers using well-known engineering practices and are not detailed here.

Both spargers and venturis require some consumption of energy to work properly. For a sparger, that energy consumption occurs as a pressure drop as the oxygen flow passes through the pores in the sparger wall. The energy consumed for the sparger is quite low and the sparger is preferred wherever the flow conditions result in sufficiently small bubbles for entrainment. In contrast, with the venturi the energy consumption occurs as a pressure drop where the liquid flow passes through the constriction; however, the venturi can typically produce bubbles of smaller size than a sparger, so the venturi may be preferred when the VFR is operating at comparatively low feed rates.

To accommodate a wide range of flow rates to the VFR, note that any particular sparger works well for providing small sized bubbles into a liquid flowing at rates within some liquid flow speed range. At the lower end of the flow range, larger bubbles may be formed and, with the flow slower, the bubbles might rise at a sufficient rate that the bubbles do not get carried down with the liquid. So while the venturi would generally require greater energy consumption than a sparger, the venturi may be preferred in some circumstances, particularly when the VFR is operating near the low end of its operating range. This non-limiting example embodiment permits the introduction of oxygen at the top of the VFR because the bubbles may be made small enough to become entrained in the liquid flow and travel downward into the reactor. While this example embodiment illustrates the use of two methods for producing small bubbles, namely a sparger and a venturi, it is understood that any method that works to produce sufficiently small bubbles for entrainment may be used.

In the example embodiment as shown in FIG. 1 the complete feed stream, consisting of waste, water, and oxygen flows downward inside of the flow partition indicated by numeral 54. Traveling downward within the upper part of the flow partition (41), the feed gets heated by heat transfer from the hot liquid flowing upward between the outside of the flow partition (41) and the inside of the reactor wall (10, 12), indicated by the numeral 56. As the temperature of the mixture increases, the reaction rate between the waste and oxygen increases, producing additional heat. As a result, the temperature is highest in the lower part of the VFR. At the bottom of the VFR most of the waste has already been oxidized, so the reaction rate decreases because the fuel is getting consumed. After the mixture turns to flow upward in the VFR outside of the flow partition (41), heat is transferred across the flow partition (41) into the downward flowing feed stream.

In about the bottom portion of the VFR, the flow partition (41) is in contact with a material that provides thermal insulation, indicated by the numeral 58, which inhibits heat transfer, and has the effect of maintaining the temperature high over a larger fraction of the flow path. The high temperature keeps the reaction higher than the rate would have been without the insulation (58), and causes more complete destruction of the waste.

The waste and water feed components flowing downward exit the flow partition (41) and flow upward in the annular space (56) outside of the flow partition (41). The now treated waste and water feed components exit the VFR through an exit pipe 60.

Thus, it is seen that in accordance with the principles of the present invention several embodiments increase the economy and utility of the VFR. Operation of these embodiments of the invention—including the pressurizing liquid, the use of a venturi and/or a sparger, the insulation of the lower portion of the flow partition, and reactor geometric preferences—will be further discussed in the paragraphs that follow.

The pressurizing liquid needs to be readily available and function under conditions related to those within the VFR. As the pressurizing liquid will surround the reactor for the full length, including the location of the maximum reactor temperature, the pressurizing liquid should be thermally stable at the maximum reactor temperature, that is, the highest temperature that occurs in the reactor under a given set of reactor operating parameters and feed properties.

The actual value of the reactor maximum temperature is a matter of preference and response to feed rates and properties. Thus, the value of the reactor maximum temperature is subject to operational control. Because the reactor maximum temperature is subject to operational control, the specific value of the reactor maximum temperature is therefore not a limitation of the principles of the present invention; but as a practical matter with the current state of the art, the value mentioned in the above description, 617° K (650° F., 343° C.), is a preferred highest value of the reactor maximum temperature as explained below.

It is well known that the wet oxidation reaction rate increases strongly with increasing temperature, but there also are important reasons for not using an excessively high temperature. As the temperature approaches the critical temperature of water (referred to previously), inorganic substances found in all but carefully purified water become much less soluble. This begins to occur at temperatures around 618° K (653° F., 345° C.) where the inorganic substances begin to precipitate out of solution. The amount of precipitation increases rapidly as the temperature approaches the critical point of water. This precipitation has caused experimental reactors to become plugged.

In addition, the corrosion rate also increases with temperature and the required pressure protection against boiling to prevent potential damage increases with higher temperatures. So while some future technical development might make operation at higher temperatures more practical, at this time the value 617° K (650° F., 343° C.) is suggested as a practical highest maximum reactor temperature.

It is understood that lower values of the maximum reactor temperature may be used as needed or preferred. As a result, the criteria for selecting a pressurizing liquid include the requirement that the liquid be thermally stable to at least 617° K (650° F., 343° C.). That is, the liquid does not pyrolize or otherwise decompose as a result of temperature until a higher temperature than the stated limit is applied. The liquid also should have a low volatility to minimize loss by evaporation and prevent boiling at any level. The liquid should be environmentally benign since a failure of the well casing could release the liquid into the underground environment. The liquid should have a density similar to that of water to provide effective pressure.

Additionally, the liquid should have at least one property that would readily distinguish the liquid from water so the space between the outer reactor wall and the well casing may be monitored for water contamination (such as might occur if the reactor developed a leak). Ideally, but not required, the liquid would not be a good heat transfer agent, as this would result in a slight increase in heat loss from the VFR to the surrounding rock formation.

While any of a number of liquids might so function, it is useful to cite a non-limiting example. As previously introduced, the non-limiting example of "Dowtherm A" heat transfer fluid available from the Dow Chemical Company fits these requirements. Dow states that the "Dowtherm A" product is thermally stable to 672° K (750° F., 399° C.). Also, the "Dowtherm A" product vapor pressure is sufficiently low at typical reactor maximum temperatures that boiling would not occur. The "Dowtherm A" product also is environmentally benign. The "Dowtherm A" product density only differs from that of water by about 6 percent (more dense). The "Dowtherm A" product electric resistivity is about 25,000 times that of water, so a reactor leak could be detected by monitoring electric resistivity. This could be done using available, well known instrumentation methods. Utilizing "Dowtherm A" as a pressurizing liquid in the example described with respect to FIG. 1 above exerts a pressure against the outside of the VFR that increases with depth and gives about 16 mPa (2340 psi) at the bottom.

Furthermore, while the "Dowtherm A" heat transfer fluid is used in many applications because of its high thermal conductivity, the thermal conductivity might be reduced by addition of a thickening, or viscosity increasing agent. And while many thickening agents that meet the requirements for the pressurizing liquid as given above could work well, again it is useful to cite a non-limiting example. The product "fumed silica" or "flowers of silica" usually made by the combustion of silicon tetrachloride is an excellent thickening agent and could be used to increase the viscosity of the pressurizing liquid. That in turn would reduce its capacity for heat transfer, or thermal conductivity.

Fumed silica is thermally stable to temperatures well above 672° K (750° F., 399° C.), environmentally benign in a liquid blend, and would not interfere with the function of the pressurizing liquid; however, while some reduction in thermal conductivity of the pressurizing liquid may be desirable, it is understood that the reduction may be accomplished by other thickening agents than fumed silica, or by means other than the use of a thickening agent, or not accomplished at all, without interfering with the basic purpose of providing a compensating pressure on the outside of the reactor wall to balance, or partially balance, the inside pressure.

An additional advantage to the use of a pressurizing liquid concerns another, totally independent method of reactor leak detection. The pressurizing liquid will have a surface in the space between the reactor and the casing that can be measured instrumentally. While minor fluctuations in that level will be common because of normal fluctuations in the reactor temperature that will cause similar fluctuations in liquid volume due to thermal expansion and contraction, such fluctuations will be small during normal VFR operation. Any sustained rise in liquid level not accompanied by a sustained rise in reactor temperature would indicate a leak of material from the reactor. Similarly, a sustained decrease in liquid level not accompanied by a sustained reduction in reactor temperature would indicate a loss of the pressurizing liquid through the casing into the underground environment. The availability of two independent methods of monitoring improves the reliability of the leak detection system.

The introduction of oxygen at a position near or at the top of the VFR instead of some significant distance downward into the reactor makes little difference in VFR operation. Using the heat and mass balance computations referred to above, no significant difference in the reactor maximum temperature occurred when the oxygen was injected into the inlet stream at the top of the reactor than when the oxygen was injected through a small concentric tube extending down from the top of the reactor to 611 meters (2000 feet) down into the reactor where the pressure was about 6.07 mPa (880 psi) higher than the pressure at the top of the reactor.

It is recognized that the feed needs some pressure at the top of the VFR to facilitate control of both flow and pressure and to prevent boiling within the reactor. (A feed pressure of about 4.14 mPa (600 psi) is recommended, but is not a limitation of the principles of the present invention, and only included here to aid in understanding of the VFR and its operation.) With oxygen addition at the top, the incoming feed stream heated slightly more rapidly as the oxidation reaction got started slightly sooner. As the reaction proceeds very slowly at low temperature, the change in temperature due to the earlier start was not large, but still favorable.

Also, while the work of oxygen compression still needs to be accomplished, introduction of oxygen at the top of the VFR shifts some of the work of compression to the feed pump. But as oxygen dissolves, or gets reacted, the oxygen stops being compressed as the oxygen travels downward into progressively higher pressure. Here the oxygen is pumped as part of the liquid phase. This results in a slight reduction in the total energy used because pumping a liquid is routinely more energy efficient than compressing gas. An additional advantage of mixing oxygen into the feed stream at or near the top of the VFR comes from handling oxygen at a lower and safer pressure than would be required for oxygen addition lower in the reactor.

The insulation of a lower portion of the flow partition also results in heating the feed stream more rapidly than the feed stream would be heated without the insulation. The synergistic effect of the insulation and the top introduction of oxygen are to heat the feed stream up to a temperature close to the reactor maximum temperature and keep the stream close to that temperature as long as it remains practical to do so. The feed stream is heated initially near the top of the reactor mostly by heat exchange with the up-flowing product stream. As the temperature of the feed stream increases, the chemical reaction rate increases, providing more heat.

The heat and mass balance computations show that most of the heat of reaction is produced well before the feed stream reaches the bottom of the reactor. As the feed stream approaches the bottom of the reactor, the reaction rate slows despite the high temperature because the concentration of waste has gone down. Basically, the reaction is running low on fuel. If the temperature also decreases, the combined effects lower fuel concentration and heat loss by exchange through the flow partition can lower the reaction rate so low that small quantities of the waste can leave the VFR un-reacted. Insulating the flow partition in the bottom section of the reactor inhibits cooling as the stream flows upward on the other side of the flow partition until the stream reaches the upper end of the insulation. This has the overall effect of concentrating the heat exchange in the upper part of the reactor, and reducing temperature change in the lower part of the reactor. This is shown in FIG. 2.

Figure 2:
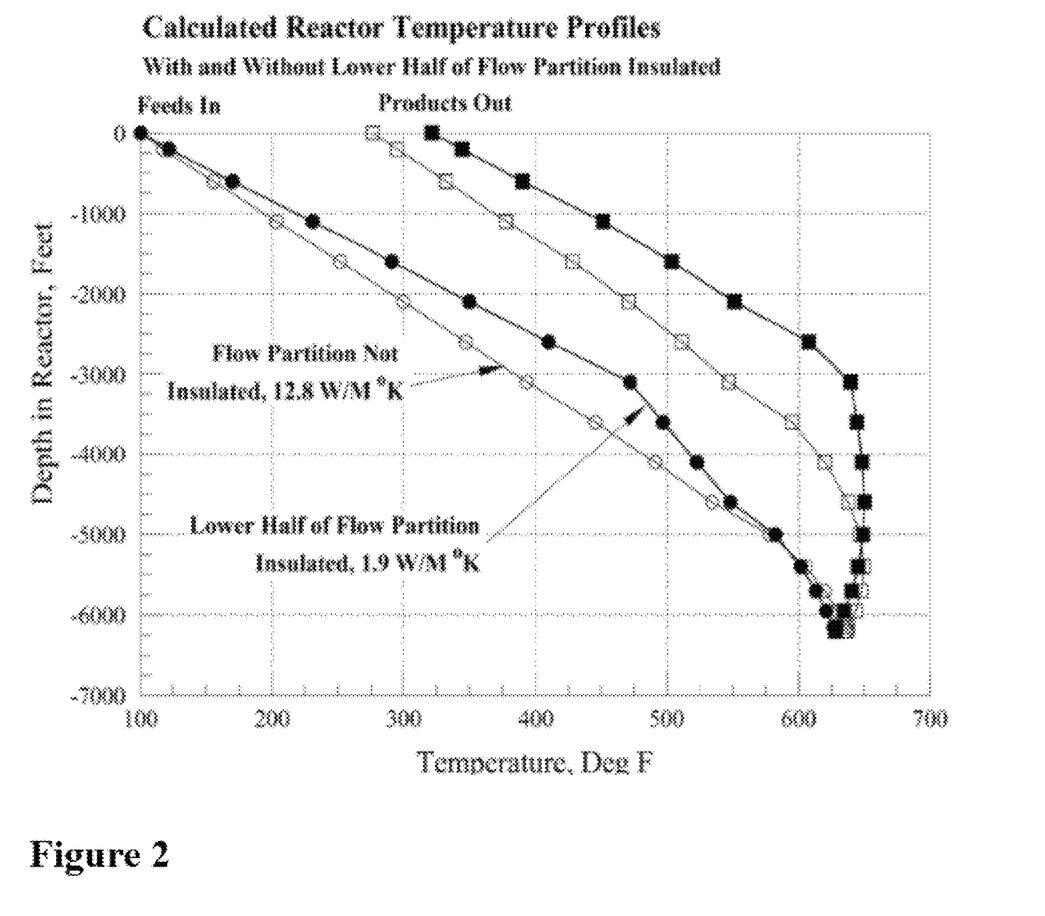
FIG. 2 is a graph of determined VFR Profiles for 12 inch (30.5 cm) of the example VFR of FIG. 1.

FIG. 2 is a graph of determined VFR profiles for 12 inch (30.5 cm) reactor of the example VFR of FIG. 1. FIG. 2 compares determined reactor temperature profiles for the same hypothetical reactor except for insulation. In one case, the reactor has an insulated section in the lower part of the flow partition, and in the other case the reactor does not. The insulation increases the determined exit temperature from 409° K (277° F., 136° C.) to 434° K (322° F., 161° C.). The computation also showed that the material inside the reactor stayed above 589° K (600° F., 315° C.) for a longer time with than without the insulation. Because of the strong dependence of reaction rate on temperature, and the longer time spent at or near the reactor maximum temperature, the waste was more completely oxidized with than without the insulation.

The determined amount of unconverted waste relative to the total waste entering the reactor went from about 4100 Wt ppm without insulation down to about 1100 Wt ppm with insulation. The concentration of waste needed at the reactor entry to maintain the same determined reactor maximum temperature went from 3.24 to 4.09 weight percent of waste (dry basis) in the feed stream resulting in an increase in the waste destruction rate from 227 to 286 common tons per day (206 to 260 metric tons per day).

It also was found that the determined temperature profiles could be maintained sufficiently high to yield an exit temperature that would easily provide electric power as the reactor feed rates were reduced to rates as low as 25 common dry tons (22.8 metric tons) per day. That is, while the quantity of electric power would decrease due to the reduced amount of hot effluent coming from the VFR, the temperature remained high enough that only a slight decrease in the efficiency of electric power production would occur. This change required an adjustment in waste concentration in the feed stream, which needs to be accomplished routinely anyway as part of normal process control.

The versatility of chemical reactors, that is, their ability to function effectively at varying feed rates is highly desirable for various reasons, including accommodation to variations in feed availability. Two series of heat and mass balance computations were made using the same reactor dimensions, but varying the feed rates. These show that, (for the 12 inch (30.5 cm) reactor) the combined effects of adding oxygen at the top of the reactor and insulating the lower part of the flow partition provide the VFR an unusually wide range of effective operating conditions.

For the 12 inch (30.5 cm) reactor, the dimensions were 6250 feet (1905 meters) total depth, 12 inch (30.5 cm) standard pipe size for the outer wall of the reactor, and 7⅝ inch (19.4 cm) standard size pipe for the flow partition, which has ceramic insulation for the lower portion. The feed (cellulose) concentrations were adjusted to provide a maximum reactor temperature between 611° K (640° F., 338° C.) and 616° K (650° F., 343° C.), and the feed pressure at the top of the reactor was kept at 6.89 mPa (1000 psi.)

Pertinent results are shown in Table 1 reproduced below, which also includes the un-reacted waste in the outlet, measured as a fraction (weight parts per million) of the waste in the feed:

TABLE 1

Varying Feed Rates to a Heat and Mass Balance Computations of a 12 inch (30.5 cm) VFR

| DSW, t/d[1] | DSW, %[2] | Max T,[3] F. | Out T,[4] F. | Time,[5] Min | Eff.[6] PPM | P Diff.[7] |
|---|---|---|---|---|---|---|
| 20.0 | 2.10 | 646 | 228 | 121 | 0 | 78 |
| 30.0 | 2.20 | 646 | 232 | 86 | 0 | 135 |
| 50.0 | 2.39 | 646 | 239 | 56 | 0.2 | 259 |
| 80.1 | 2.69 | 645 | 252 | 40 | 38.4 | 372 |
| 120.0 | 3.03 | 642 | 268 | 30 | 799 | 433 |
| 175.1 | 3.51 | 645 | 290 | 24 | 3514 | 320 |

Of the input variables only, the feed flow rate and composition were varied between heat and mass balance computations. Table 1 shows several interesting results. The first column shows the range of waste destruction rates, indicating a ratio from highest to lowest, or the "turn-down ratio" at 8.8 high to low. The higher feed rates required higher waste concentrations as shown in the second column. The third column shows that the maximum reactor temperature was close to the same value for all the runs.

The fourth column in Table 1 shows the outlet temperature, which relates to the efficiency of utilizing the heat for conversion to electric energy. The technology for this conversion is widely practiced utilizing geothermal sources and is not a part of the present invention, but a common rule from the geothermal energy industry is that to be economical the hot water source needs to have a temperature higher than about 378° K (220° F., 104° C.). Thus, the conversion of thermal to electric energy is forecast to be economical over the whole range of feed rates used in these computations. As described above, the conversion efficiency increases strongly with increasing temperature, so while the electric power associated with the lowest feed rate could be produced economically, the quantity would be lower than that associated with the higher feed rates.

The fifth column in Table 1 shows the total residence time in the VFR for each heat and mass balance computation. The final two columns show important results relating to the limits of the VFR versatility. The sixth column gives an indicator of VFR efficiency. VFR efficiency is determined as the un-reacted waste divided by the total amount of waste fed to the reactor in weight parts per million. The sixth column shows that the efficiency is down significantly at the highest reactor feed rate.

The last or seventh column is derived from both the pressure profiles and the associated water vapor pressure profiles. As long as the actual pressure exceeds the water vapor pressure, by definition, boiling does not occur. Boiling within stream flow without a design that includes apparatus specifically for boiling (as in a coal fired power plant for example) can cause rapid pressure fluctuations making the process difficult to control. To prevent boiling, additional pressure could be applied to the feed at the top of the reactor. This is easy to do in theory, but as pointed out above, additional pressure makes oxygen handling more difficult, more expensive, and less safe. So, as the results in the sixth column indicate, the highest feed rate in the table may be at or near a practical upper limit. The results in the seventh column, similarly, indicate that the lowest feed rate may be at or near a practical lower limit.

As mentioned above, similar effects on outlet temperature can be achieved without insulation for high volume VFRs. Table 2 shows results from heat and mass balance computations like those shown in Table 1 for a 12 inch (30.5 cm) reactor, but the Table 2 computations were made for a 20 inch (50.8 cm) reactor with the feed pressure at 4.14 mPa (600 psi), and allowed variation in reactor maximum temperature:

TABLE 2

Varying Feed Rates to a Heat and Mass Balance Computations of a 20 inch (51 cm) VFR

| DSW, t/d[8] | DSW, %[9] | Max T,[10] F. | Out T,[11] F. | Time,[12] Min | Eff.[13] PPM | P Diff.[14] |
|---|---|---|---|---|---|---|
| 646.7 | 5.39 | 644 | 383 | 29.4 | 2602 | 295 |
| 402.1 | 4.47 | 633 | 340 | 40.4 | 1069 | 597 |
| 288.6 | 3.94 | 622 | 315 | 50.9 | 645 | 723 |
| 202.7 | 3.58 | 623 | 299 | 66.2 | 88 | 726 |
| 71.3 | 3.21 | 621 | 291 | 164.5 | <10 | 627 |

Again, these results show a high versatility for operating conditions with a turn-down ratio slightly more than eight, highest to lowest. If the waste supply should become temporarily short, the VFR can be kept running at a low feed rate and high efficiency. For high volume operation, a 20 inch (50.8 cm) reactor diameter approximately 6250 feet (1905 meters) appears to offer advantages over smaller reactor diameters, particularly in combination with the improvements taught herein. The preferred 11 inch (27.9 cm) schedule 40 pipe size was used for the flow partition.

Additional Considerations

As used herein any reference to "an embodiment" means that a particular element, feature, structure, or characteristic described in connection with the embodiment is included in at least one embodiment in accordance with the principles of the present invention. The appearances of the phrase "an embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the present invention. This description should be read to include one or at least one and the singular also includes the plural unless it is obvious that it is meant otherwise.

The terms "about" or "approximately" or the like, when used with a number, may mean that specific number, or alternatively, a range in proximity to the specific number, as understood by persons of skill in the art field (for example, +/−10%).

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the scope or spirit defined in the appended claims.

What is claimed is:

1. A vertical flow reactor comprising:
   a casing;
   an outer wall contained within the casing, the outer wall being partially above and partially below ground level of a bore hole in which the vertical flow reactor is contained;
   an annular space defined between the outer wall and the casing;
   a flow partition contained within the outer wall;
   a transport apparatus that directs pre-mixed waste and water feed components into the flow partition, the waste and water feed components flowing downward in the flow partition and exiting in the annular space outside of the flow partition, where the waste and water feed components flow upward;
   a compressor that introduces oxygen into the waste and water feed components at or near the top of the vertical flow reactor as small bubbles, the waste, water, and oxygen combination flowing downward within the flow partition such that, the waste, water, and oxygen is heated by heat transfer from liquid flowing upward in the annular space outside the flow partition.

2. The vertical flow reactor of claim 1 wherein the oxygen introduced as a volume is less than the waste and water feed components as a volume.

3. The vertical flow reactor of claim 1 wherein the oxygen is introduced in bubbles sufficiently small that rise rate of oxygen bubbles is slower than flow speed of the waste and water feed components.

4. The vertical flow reactor of claim 3 wherein the oxygen is introduced into the flowing stream through a venturi.

5. The vertical flow reactor of claim 3 wherein the oxygen is introduced into the flowing stream through a sparger.

6. The vertical flow reactor of claim 1 wherein the annular space contains a pressurizing liquid to add pressure between the outer wall and the casing.

7. The vertical flow reactor of claim 1 wherein the annular space contains a pressurizing liquid to add pressure between the outer wall and the casing sufficient to at least partially balance pressure inside the outer wall, whereby enabling reactor wall thickness to be reduced.

8. The vertical flow reactor of claim 7 wherein the pressurizing liquid is environmentally benign, thermally stable at a maximum temperature likely to be encountered within the annular space, and has a density similar to the density of the liquid within the vertical flow reactor.

9. The vertical flow reactor of claim 7 wherein the pressurizing liquid has a density higher than the density of the liquid within the vertical flow reactor to provide a better pressure balance.

10. The vertical flow reactor of claim 7 wherein the pressurizing liquid contains a stable suspension of a solid to provide different density and improve thermal conductivity.

11. The vertical flow reactor of claim 10 wherein the pressurizing liquid contains a stable suspension of "fumed silica" or "flowers of silica".

12. The vertical flow reactor of claim 7 wherein the pressurizing liquid has an easily measurable property that differs from that of the liquid within the vertical flow reactor to facilitate detection of leaks.

13. The vertical flow reactor of claim 12 wherein the easily measurable property comprises electrical resistivity.

14. The vertical flow reactor of claim 7 wherein the pressure liquid comprises "Dowtherm A" heat transfer fluid.

15. The vertical flow reactor of claim 7 wherein the transport apparatus conducts the pre-mixed waste and water feed components into the flow partition at or near the upper portion of the vertical flow reactor.

16. The vertical flow reactor of claim 7 wherein the compressor introduces oxygen into the waste and water feed components at or near the upper portion of the vertical flow reactor as small bubbles.

17. The vertical flow reactor of claim 1 further comprising, at or about the bottom portion of the vertical flow reactor, the flow partition in contact with a material that reduces heat transfer property of the lower portion of the flow partition such that heat transfer is inhibited and temperature is higher over a portion of the flow path relative to the temperature in an absence of the material that reduces the heat transfer, the higher temperature maintaining a reaction rate higher relative to the reaction rate in an absence of the material that reduces the heat transfer, thereby causing more complete destruction of waste.

18. The vertical flow reactor of claim 1 further comprising, at or about the bottom portion of the vertical flow reactor, a lower portion of the flow partition is insulated to reduce heat transfer, thus causing more heat transfer to occur in the upper portion and providing more time for reaction at high temperature in the lower portion.

19. The vertical flow reactor of claim 18 wherein the lower portion of the flow partition is insulated with ceramic coatings on the flow partition to reduce heat transfer.

20. The vertical flow reactor of claim 18 wherein the lower portion of the flow partition is insulated by inserting an insulating cylinder within the flow partition.

21. The vertical flow reactor of claim 18 wherein the lower portion of the flow partition is insulated by using an insulating ceramic pipe as the flow partition.

22. The vertical flow reactor of claim 1 wherein the flow partition positioned in the center of the vertical flow reactor.

23. The vertical flow reactor of claim 1 defining a length to diameter ratio, the length to diameter ratio of the vertical flow reactor being between about 2600 and about 4000 to provide higher volume throughput and higher exit stream temperature.

24. The vertical flow reactor of claim 23 wherein the length to diameter ratio of the vertical flow reactor is between about 3100 and about 3500 to provide higher volume throughput and higher exit stream temperature.

25. The vertical flow reactor of claim 24 wherein the length to diameter ratio of the vertical flow reactor is about 3300 to provide higher volume throughput and higher exit stream temperature.

26. The vertical flow reactor of claim 1 wherein the vertical flow reactor defines an annular to center area ratio, the annular to center area ratio is between about 1.3 and about 2.4 to facilitate high destruction efficiency while maintaining a high level of pressure protection against boiling.

27. The vertical flow reactor of claim 26 wherein the annular to center area ratio is between about 1.6 and about 2.0 to facilitate high destruction efficiency while maintaining a high level of pressure protection against boiling.

28. The vertical flow reactor of claim 27 wherein the annular to center area ratio is about 1.8 to facilitate high destruction efficiency while maintaining a high level of pressure protection against boiling.

* * * * *